United States Patent [19]
Chang

[11] Patent Number: 6,089,104
[45] Date of Patent: Jul. 18, 2000

[54] ULTRASONIC FLOW METER USING TRANSIT TIME ACROSS TUBE CHORDS FOR DETERMINING THE FLOW RATES

[76] Inventor: Hak Soo Chang, Da-201 Gumho Apt., Seocho-Dong, Seoucho-Gu, Seoul, Rep. of Korea

[21] Appl. No.: 08/863,471

[22] Filed: May 27, 1997

[30] Foreign Application Priority Data

May 27, 1996 [KR] Rep. of Korea ............... 96/17987

[51] Int. Cl.⁷ ...................................... G01F 1/66
[52] U.S. Cl. ......................................... 73/861.27
[58] Field of Search ................. 73/861.27, 861.28, 73/861.29, 861.31, 861.18, 861.23; 361/151

[56] References Cited

U.S. PATENT DOCUMENTS

| | | | |
|---|---|---|---|
| 3,188,862 | 6/1965 | Roth | 73/861.26 |
| 3,204,456 | 9/1965 | Welkowitz | 73/861.26 |
| 3,751,979 | 8/1973 | Ims | 73/861.27 |
| 4,162,630 | 7/1979 | Johnson | 73/861.27 |
| 4,300,401 | 11/1981 | Pederson | 73/861.31 |
| 4,337,667 | 7/1982 | Takada | 73/861.28 |
| 4,452,090 | 6/1984 | Kou et al. | 73/861.28 |
| 4,462,261 | 7/1984 | Keyes et al. | 73/861.27 |
| 4,530,077 | 7/1985 | Dorr | 367/151 |
| 4,860,593 | 8/1989 | De Concini et al. | 73/861.29 |
| 5,115,414 | 5/1992 | Atalar et al. | 367/151 |
| 5,515,721 | 5/1996 | Kim et al. | 73/861.27 |
| 5,531,124 | 7/1996 | Kim et al. | 73/861.27 |

FOREIGN PATENT DOCUMENTS

| | | |
|---|---|---|
| 4-47768 | 9/1984 | Japan. |
| 2139755 | 11/1984 | United Kingdom. |

*Primary Examiner*—Max Noori
*Assistant Examiner*—Jagdish Patel

[57] ABSTRACT

An ultrasonic multi-channel flow rate measuring system provides a single ultrasonic pulse emitting transducer mounted in a circular tube in which fluid flows at a tube cross section intermediate a short straight length of tubing extending upstream and downstream from the emitting transducer location at equal distances (d). A plurality of ultrasonic receiving transducer pairs are mounted respectively in tube cross sections at upstream and downstream ends of the length of tubing at different radial distances from the pulse emitting transducer, thereby defining a plurality of measurement channels within the tubing. The flow rate in the tube is then calculated as a function of the radial distances between the emitting transducer and the receiving transducers in the different measurement channels. Increased flow velocity accuracy is achieved by increasing the number of receiving transducers, thus defining more channels. The size of the transducers is reduced, and pulse emission direction is limited to reduce reflections from tube walls. Operation on all channels simultaneously produces an instantaneous flow rate time period.

5 Claims, 6 Drawing Sheets

ULTRASONIC FLOW METER USING TRANSIT TIME ACROSS TUBE CHORDS FOR DETERMINING THE FLOW RATES

BACKGROUND OF THE INVENTION

The invention is related to an ultrasonic flow rate measuring technology, and particularly, to providing an ultrasonic multi-channel flow rate measuring apparatus for measuring the flow rate in places having the flow velocity distribution of gas or fluid formed in an abnormal or complex state in a tube and in a larger caliber tube or pipe.

PRIOR ART

Conventional flow meters such as ultrasonic clamp-on flow rate meters, electromagnetic type flow rate meters, differential pressure flow rate meters (including an orifice, a nozzle etc.) should be almost always mounted on the straight portion of a tube or a pipe having a long length in order to be operated in a normal state, because the flow rate coefficients tested/corrected by a standard flow rate meter cannot be uniformly adapted under any condition of the pipe. In other words, the flow rate measuring error becomes larger due to the unstableness of the flow rate coefficients in case that the straight portion subject to mount the flow rate meter is relatively shorter including its left and right length, or a valve is installed adjacent to the flow rate meter. Also, if the range of the flow rate to be measured is larger, there has not been a standard flow rate measuring apparatus adaptable to the larger caliber tube in order to test/correct the fluid, especially gas. It means that it is very difficult to measure the flow coefficient through the testing/correcting method, covering the total range of a larger flow rate to be measured. Only, the flow rate coefficient of the larger caliber pipe may be selected through the similarity criterion method. Furthermore, it is not possible for the pipe having the larger diameter D to have the straight portion($L \geq 60D$). Herein, it is known that if the straight portion is short or the distribution of the flow velocity is changed from time to time in a complex state, a standard flow rate meter has difficulty in testing/correcting the measuring state due to the larger range of the flow rate to be measured. In that case, it is advantageous that a multi-channel low rate meter is used for promoting the measuring reliability.

The ultrasonic multi-channel flow rate meters well-known are typically apparatus for dividing the tube cross-section to pass fluid therethrough into a plurality chords, measuring the average flow velocity on the chords by the ultrasonics and calculating the total average flow velocity of the tube cross-section or apparatus for measuring the distribution state of the flow velocity, measuring parts of the flow rate corresponding to selected chords and calculating the total flow rate based on the summing up of these flow rates partly measured. For example, prior arts such as Patent Publication No. GB 139755A, U.S. Pat. Nos. 5,515,721 and 5,531,124, Japanese Laid-Open Patent Application No.92-47768 and a flow rate meter for an open river manufactured by American Ultraflux Company (Model No. UF-2100-0C) have been disclosed.

The conventional ultrasonic multi-channel flow rate meter now will be described referring to FIG. 1, which has three chords in the chord configuration.

Three paired transducers $1_1$, $2_1$; $1_2$, $2_2$; and $1_3$, $2_3$ are respectively mounted to measure the flow velocity on chords I, II and III, wherein the transducer comprises an emitter for radiating the ultrasonic wave and a receiver for receiving the radiated ultrasonic wave. The ultrasonic multi-channel is also subject to use a time difference method in calculating the flow velocity. In other words, the flow velocity $V_1$ on the chord I is measured based on the formula as follows:

$$V_I = \frac{t_{21} - t_{12}}{2L_1 \cos\varphi_1} \cdot C^2 = \frac{t_{21} - t_{12}}{t_{21} \cdot t_{12}} \cdot \frac{L_1^2}{2d} \qquad (1)$$

Herein, C is an ultrasonic velocity, when the flow velocity V is zero; $L_i$ is the converting period interval; d is equal to $L\cos\varphi$; $t_{21}$ is a time that the ultrasonic wave is substantially propagated from the transducer $1_1$ and the opposite transducer $2_1$; and $t_{12}$ is a time that the ultrasonic wave is substantially propagated from the transducer $2_1$ and the opposite transducer $1_1$. The flow velocity measuring multi-channel is subject to operation of given time intervals in sequence. Of course, all multi-channels can be operated, simultaneously, but it has to ensure that adjacent channels have not any influence on one another, otherwise the frequencies of channels are so much different from one another, because the transducers have a little directional angle (so called "the directional property of a beam shape"). And, it is suitable for a dynamic flow rate meter shortening the instant flow rate measuring time by operating all channels at once, but that introduces many problems in that the size l of the transducer and the wave length ratio $1/\lambda$ of the ultrasonic waves must be made larger, but it is not possible to set the size l at the auxiliary larger value according to the tube diameter and the number of channels in order to improve the directional property of the transducer like beams. When the frequency becomes higher, the wave length gets smaller. To cause a large reduction of the ultrasonic waves. If there are floating materials in fluid, a large reflective defusion occurs. Gas also has a wave length larger than that of liquid, so that it is not possible to form the ultrasonic beam.

If various frequencies are selected corresponding to each channel, the electronic circuit becomes more complex, and the delay times for the different channels appear different from one another. Compensating for these delay times is hard work, and the measuring error of the ultrasonic propagation time becomes larger (under the condition using various filters). A method for operating channels in sequence under the condition that the form of the flow velocity distribution is relatively stable has been used.

But, the conventional ultrasonic flow rate meters have disadvantages as follows:

First, the number of channels must be increased so as to ensure the accuracy of the flow rate measuring if the distribution of a flow velocity is changed into the complex state in places where the straight portion is short, especially near the valve. If the number of channels is increased, the diameter of the transducer must become smaller. In that case, the ultrasonic wave must be emitted with the larger energy to supply the receiving intensity. This increases the intensity of the reverberation and the noise level.

Second, if channels are operated in sequence, the more the number of channels are increased, and more flow rate measuring time is required. Assuming that the flow rate measuring is repeatedly performed a few times due to the pulsation the flow velocity, the flow rate measuring time is more and more prolonged. Especially, if the gas flow rate is measured, the flow rate measuring requires longer Third, in order to smoothly perform the emitting/receiving of the ultrasonic wave in gas, the transducer must have a larger diameter due to the relative lower frequency to secure the required directional property. Then, the size of the transducer is restricted according to the diameter and the number of channels. It is difficult to ensure the required directional property. Also, even though the frequencies for different channels are set different from one another, the time delay difference, the propagation time error, the reverberation phenomena, etc. as described above must be resolved.

Fourth, the changing ratio of the flow rate for example, the ratio of the maximum flow rate $Q_{max}$ and the minimum flow rate $Q_{min}$, is much larger (50:1). Because of this, the tolerance error given is often offset in the total measuring range. In the conventional configuration of the flow rate measuring channel, the flow velocity can be measured based on the time difference method (or the frequency difference method), but even though the tube has the smaller diameter of 600 mm, the time difference $\Delta t=(t_{21}-t_{12})$ is very small in the formula (1).

For example, if the flow rate of water is measured, and assuming that 2d is equal to 0.6 m and the minimum flow velocity V on any chord is corresponding to 0.5 m/sec in the tube having an inner diameter of 600 mm, the time difference is as follows:

$$\Delta t = \frac{2dV}{C^2} \approx 0.14 \cdot 10^{-6} \text{ s}$$

If the time difference is measured by the error of 1%, the tolerance error of $\Delta t$ must be $1.4 \times 10^{-9}$ s, and the measuring tolerance error of the ultrasonic propagation between the transducers must be $0.7 \times 10^{-9}$ s. The total average flow velocity does not usually exceed 10 m/s. As a result, $V_{min}$ of 0.5 m/s corresponds to the flow rate changing ratio of 20:1. It means that the conventional time interval measuring technology can overcome the tolerance error of $0.5 \times 10^{-9}$ s, but the time interval measuring apparatus is very complex and expensive, and its using condition is very critical. Gas has a larger tolerance error than that of fluid, because its ultrasonic velocity is four times as low as that of fluid.

If the phase difference method is used instead of the time difference method, the phase difference $\Delta \phi$ is as follows:

$$\Delta \varphi = \frac{2dV}{C^2} \cdot \omega \quad (2)$$

Herein, $\omega$ is equal to $2\pi f$, which shows the frequency of the ultrasonic waves. If the ultrasonic frequency f is 1 MHz, the phase difference is as follows:

$\Delta \phi \approx 1.4$ Rad $\approx 80.2°$

Herein, it is noted that it is advantageous to measure the phase difference using a phase detector with an error of 1%. The phase difference method is more simple and inexpensive over the time difference method.

But, the phase difference flow velocity measuring formula cannot be used in the configuration of the conventional multi-channel flow velocity measuring system. The reason is that the paired ultrasonic transducers $1_i$ and $2_i$ cannot receive or emit the continuous ultrasonic wave at the same frequency, simultaneously. If the phase difference method is used, another channel is added to emit/receive the ultrasonic wave toward the direction opposite to the flow velocity one. In other words, the propagation tracks of the ultrasonic wave are crossed with respect to each other. Then, four ultrasonic transducers are required so as to establish one flow velocity measuring channel, and the flow rate meter becomes complex.

Figure 1:
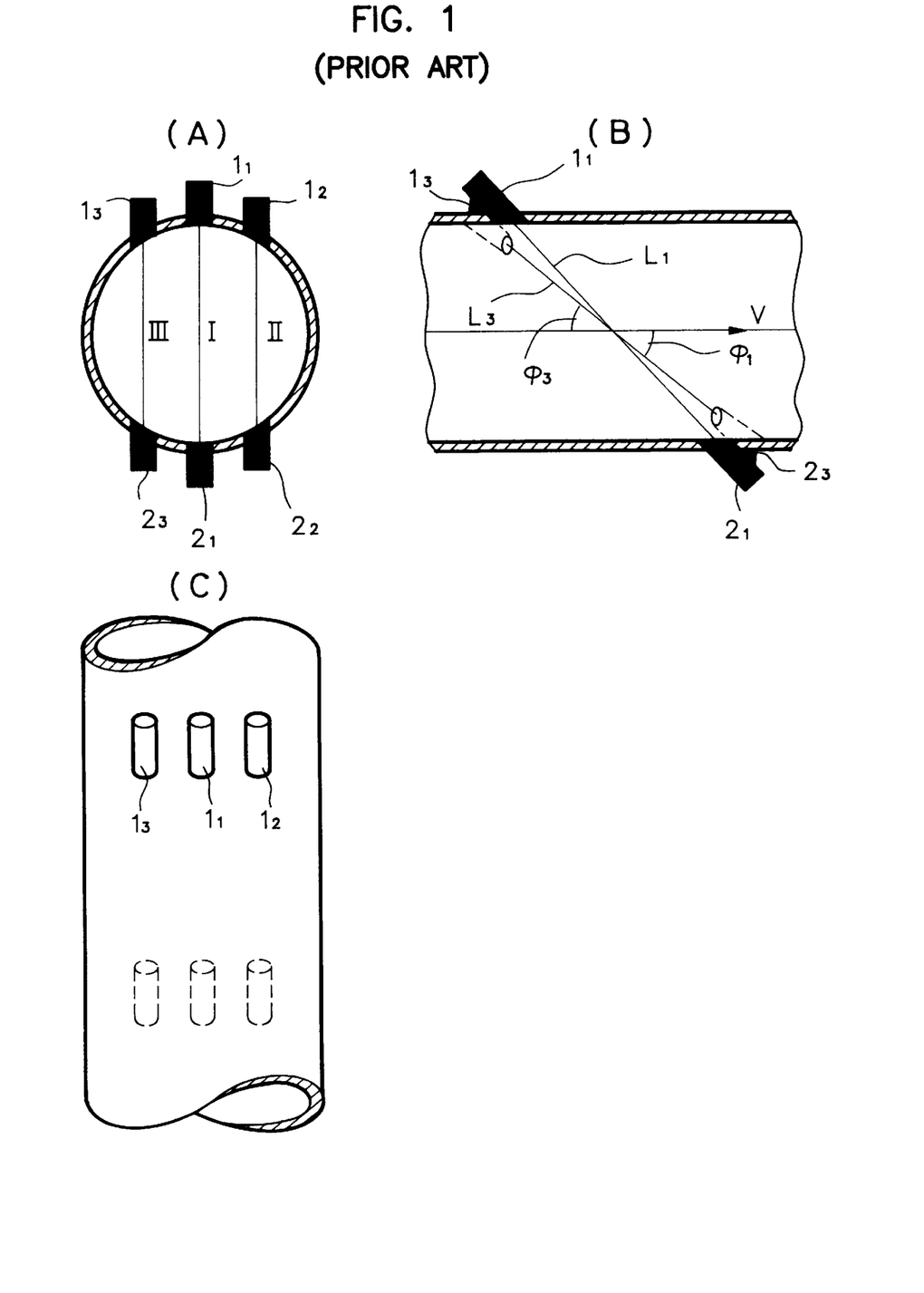

Fifth, as shown in FIG. 1, the ultrasonic transducers must be mounted at various angles. It means that the mounting work is difficult, the transducer is often projected into fluid, or the careless mounting work causes a flaw or groove to be formed around the transducer, thereby giving a bad effect on the flow velocity distribution.

Herein, it is known that the conventional ultrasonic multi-channel flow rate meter for measuring the flow velocity on a number of chords and calculating the flow rate has various disadvantages and problems when increasing the number of the flow velocity measuring channels.

An object of the invention is to provide an ultrasonic multi-channel flow rate measuring apparatus for measuring the flow rate in places having the abnormal or complex flow velocity distribution of gas or fluid in a tube and in larger caliber tubes or pipes.

Another object of the invention is to provide an ultrasonic multi-channel flow rate measuring apparatus for reducing the limitation of the number of channels when the size of an ultrasonic transducer is increased or many channels are measured in order to secure the accuracy of the flow rate measurement under the condition of the abnormal or complex flow velocity distribution.

Another object of the invention is to provide an ultrasonic multi-channel flow rate measuring apparatus for significantly reducing the flow rate measuring time by operating all channels at once.

Another object of the invention is to provide an ultrasonic multi-channel flow rate measuring apparatus for enabling the flow velocity to be measured by the time difference method according to the inner diameter of a tube and the range of the flow rate to be measured.

Another object of the invention is to provide an ultrasonic multi-channel flow rate measuring apparatus for enabling the flow velocity to be measured by the time difference method.

Another object of the invention is to provide an ultrasonic multi-channel flow rate measuring apparatus including a multi-channel for enabling the flow velocity to be measured by the phase difference method.

Another object of the invention is to provide an ultrasonic multi-channel flow rate measuring apparatus simplifying an electronic circuit to measure the flow velocity and facilitating the mounting of transducers on a tube.

SUMMARY OF THE INVENTION

According to the invention, an ultrasonic multi-channel flow rate measuring apparatus comprises an ultrasonic emitting transducer mounted at one position of a circular tube, a number of ultrasonic receiving transducers mounted around the circumference of the tube at a midpoint along a length extending a distance d from the left and right of the ultrasonic emitting transducer. A number of channels dividing the tube cross section into various regions defined by chords having radii extending from the emitting transducer for measuring the flow velocities of the channels and calculating the flow rate using the approximate integral method. This enables the flow rate in the larger diameter tubes to be measured under the condition of a complex flow velocity distribution along a short straight portion of the tube. By increasing the number of channels for measuring the flow velocity, the size of the ultrasonic transducers are reduced. By operating on all channels at once the instantaneous flow rate time period is measured.

BRIEF DESCRIPTION OF THE DRAWINGS

The invention now will be described in detail with the reference to the accompanying drawings, in which:

FIGS. 1(A), (B) and (C) are views illustrating the configuration of a multi-channel for measuring the ultrasonic flow velocity according to the prior art;

FIGS. 2(A), (B) and (C) are views illustrating the configuration of a multi-channel system for measuring the ultrasonic flow velocity according to the invention;

FIGS. 3(A) and (B) are views illustrating the operation of an ultrasonic directional adjustment device according to the invention.

FIGS. 6(A), (B) and (C) are views illustrating a method for calculating the flow rate after chords positioned in a radial direction are rearranged according to the invention.

DETAILED DESCRIPTION OF THE INVENTION

Figure 2:
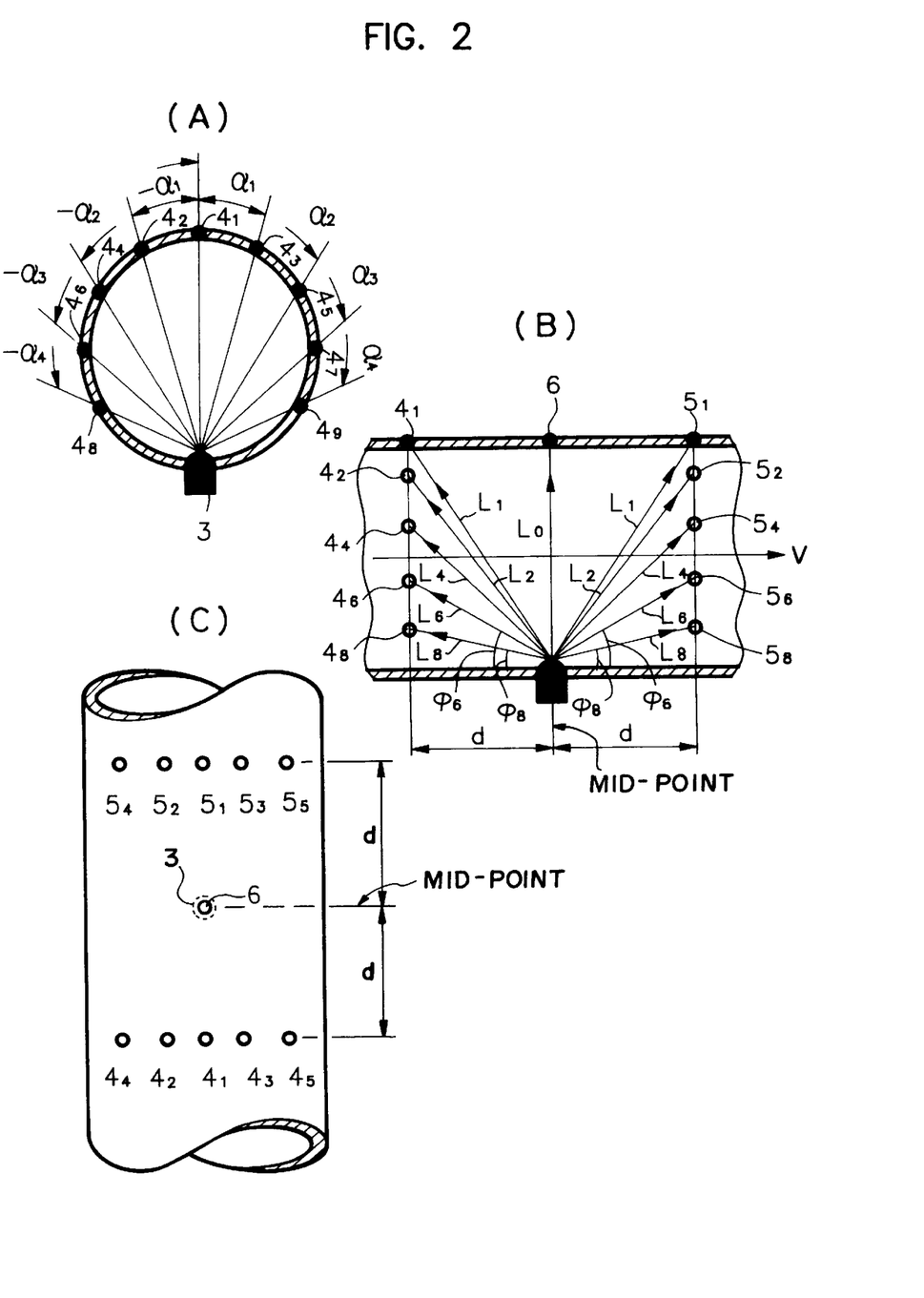

FIG. 2 shows the arrangement of a multi-channel system for measuring the flow velocity. A transducer 3 emits ultrasonic waves having the directional property over 180° to be propagated in radial directions in the tube, which is called an ultrasonic vibrator, below. A number of ultrasonic receiving transducers $4_1, 4_2, 4_3 \ldots 4_n, 5_1, 5_2, 5_3 \ldots 5_n$ and 6 receive the signals propagated from the vibrator 3, which transducers are called receivers, below. The vibrator 3 may have the emitting surface of a size smaller than the wave length of the ultrasonic waves, because it does not emit the ultrasonic beam, unlike the prior technology. Accordingly the vibrator 3 is relatively small. The ultrasonic receivers $4_i$ and $5_i$ have only the receiving function, and not the emitting function, unlike the prior technology. The receivers $4_i$ and $5_i$ are arranged in an interval d from the left and right sides of the vibrator 3 around the circular circumference of the tube.

The receivers $4_1$ and $5_1, 4_2$ and $5_2, \ldots 4_n$ and $5_n$ are paired with each other to constitute the flow velocity measuring channel and are arranged symmetrical to each other by the reference to vibrator 3. The distances $L_i$ between the vibrator 3 and the receivers $4_i$ are the same as that of the vibrator 3 and the receiver $5_i$. Therefore, the fluid flow cross section is divided into a number of chords in a radial shape. The chords are arranged at angles $-\alpha_1, -\alpha_2, \ldots, +\alpha_1, +\alpha_2, \ldots$ by the reference of the vibrator 3. The angles $\pm\alpha_i$ are selected according to the flow velocity distribution of places intended to measure the flow rate. In other words, the angles $+\alpha_i, -\alpha_i$ are not required to be symmetrical to each other.

If the average flow velocity direction V corresponding to the axis of the tube, the flow velocity $v_i$ on the distance $L_i$ between the vibrator 3 and the receivers $4_i$ or $5_i$ is as follows:

$$v_i = \bar{V}_i \cdot \cos \phi_i$$

Herein, $\phi$ is an angle between a line showing the distance $L_i$ and the flow velocity direction. The flow velocity measuring channels are operated as follows:

Firstly, a time difference method for the measuring of the flow velocity is explained below. the vibrator 3 emits the ultrasonic waves in a radial shape. The paired receivers $4_i$ and $5_i$ receive the ultrasonic waves at different times according to the propagation distance $L_i$ and the flow velocity and generate the output signals. For example, the ultrasonic propagation times on the distance $L_i$ between the vibrator 3 and the receiver $4_i$ or $5_i$ (under the condition of compensating for the delay time) are as follows:

$$t_{4i} = \frac{L_i}{C - v_i}; \quad t_{5i} = \frac{L_i}{C + v_i}$$

Then, a time difference measuring apparatus receives the signals from the receiver $4_i$ or $5_i$ and converts them into the pulse signals. The time difference is calculated as follows:

$$\Delta t = t_{4i} - t_{5i} = \frac{2L_i \bar{V}_i \cos\varphi_1}{C^2} = \frac{2dV_i}{C^2}$$

The flow velocity $\bar{V}_i$ at a right angle to the chord I is as follows:

$$\bar{V}_i = \frac{\Delta t_i C^2}{2d}$$

At that time, the formula (1) for measuring the flow velocity for every channel using the ultrasonic velocity measuring formula $$\left( C^2 = \frac{L_i^2}{t_{4i} \cdot t_{5i}} \right)$$

is not required, because the ultrasonic velocity C is uniform at the interval d of the tube.

According to the invention, the receiver 6 for measuring the ultrasonic waves is positioned at the point that the diameter line of the tube passing through the center of the vibrator 3 crosses the tube wall. Assuming that the distance between the vibrator 3 and the receiver 6 is $L_0$, the ultrasonic velocity $C^2$ is as follows:

$$C^2 = \frac{L_o^2}{t_o^2} \quad (3)$$

$$(v = V_D \cdot \cos 90° = 0)$$

Of course, the direction of the average flow velocity may not be 90° with respect to the diameter line, because of the mounting error, the pulsation of the flow velocity direction, etc. If the angle is 90°±1, the error of $C^2$ is $10^m$/s. It can be ignored by ±0.024%.

Therefore, the ultrasonic measuring channel system results in a simple electronic circuit for measuring the ultrasonic velocity. On the contrary, if the formula (1) is used, the ultrasonic propagation times $t_{4i}$ and $t_{5i}$ must be respectively measured and stored in a flow velocity and flow rate calculating apparatus. And, the delay time τ must be deleted from the time measuring the flow velocity from the emitting to the receiving of the ultrasonic wave in a direction opposite to the flow velocity direction, so that the ultrasonic velocity $C^2 = L^2/(t_{12} \cdot t_{21})$ can be exactly calculated. Also, it is difficult to control the delay times on all channels at the same value. Herein, it is known that the invention includes a separate ultrasonic measuring channel to measure the time difference $\Delta t_1$ for the flow measuring channel. As a result, there is no problem in compensating for the delay time, because the delay times on paired channels are offset to each other.

$$\Delta t_i = (t_{4i} + \tau_i) - (t_{5i} + \tau_i) = t_{4i} - t_{5i}$$

Figure 3:
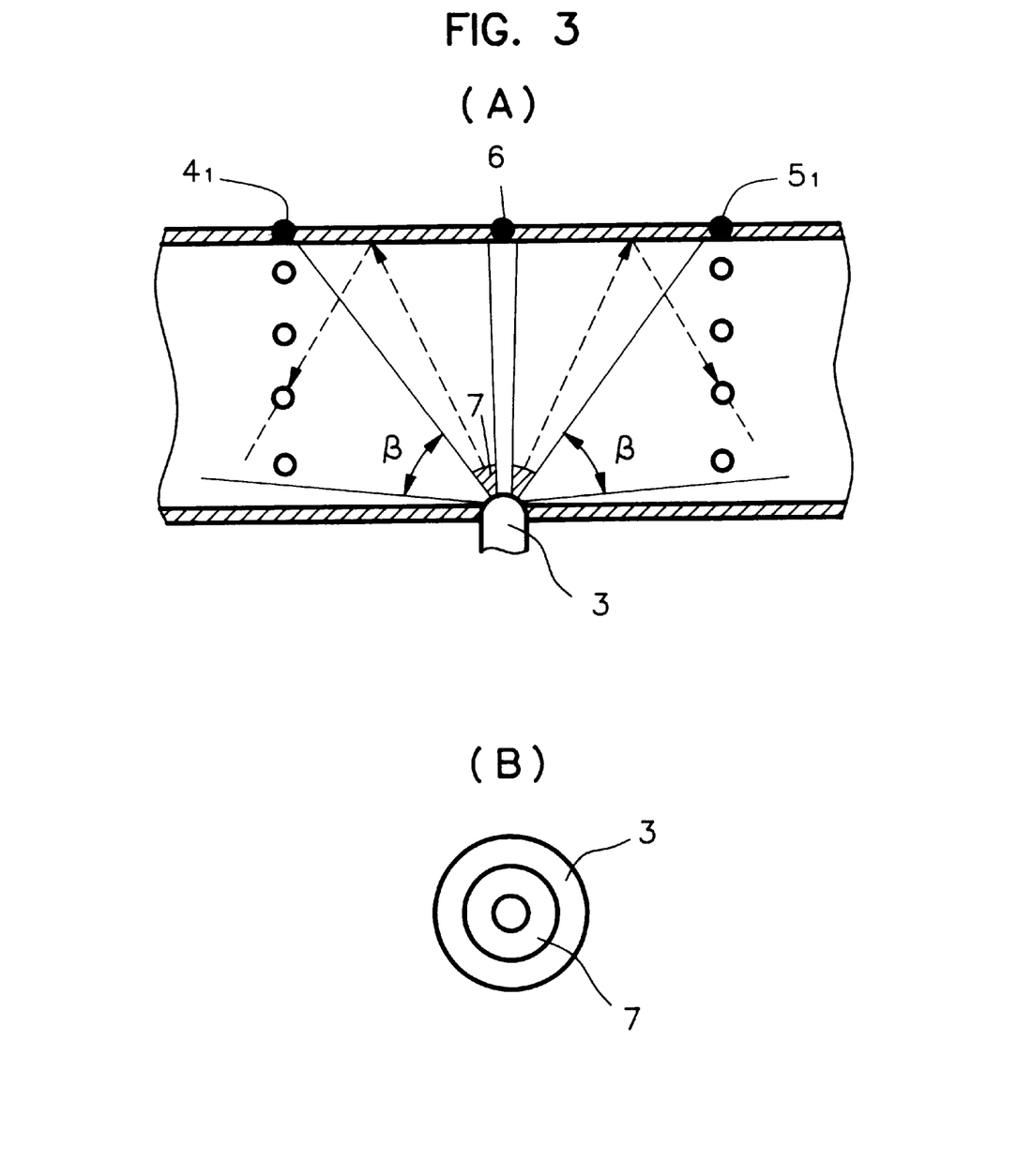

Secondly, the phase difference method for measuring the flow velocity is based on the formula (2). The ultrasonic waves are continuously emitted during the operation of a required phase difference detector, and then the phase difference detector receives the output signals from the receivers $4_i$ or $5_i$. In that case, as shown in FIG. 3, the flow velocity measuring may be exactly performed, because the receivers receive the waves reflected on the tube wall in the interval d. But, it is easy to propagate the ultrasonic waves toward only the direction of the target receiver to which an absorber 7 is attached on the portion except for the emitting surface of the vibrator. If a piezoelectric transducer is used, it can be reconstructed into a cylindrical shape structure, or a conical reflective mirror may be installed on the front surface of the vibrator.

On the other hand, the flow velocity measuring based on the time difference method is preferably performed, if the flow rate of gas is measured and the diameter of the tube is larger, because the time difference $\Delta t_1$ is larger than that of the fluid. At this time, to interrupt the reflective waves off the tube wall is a known technology.

If the gas flow rate is measured in a larger caliber tube, a lower frequency is used. It means that the electromagnetic transducer can be used as a vibrator. The receiver is relatively small, because it only receives the ultrasonic wave and does not require directional properties in the narrow angle $\beta$. Also, the ultrasonic transducers 3, $4_i$, $5_i$ and 6 are centrally mounted on the tube wall perpendicular to the contact surface. This facilitates their mounting.

Figure 4:
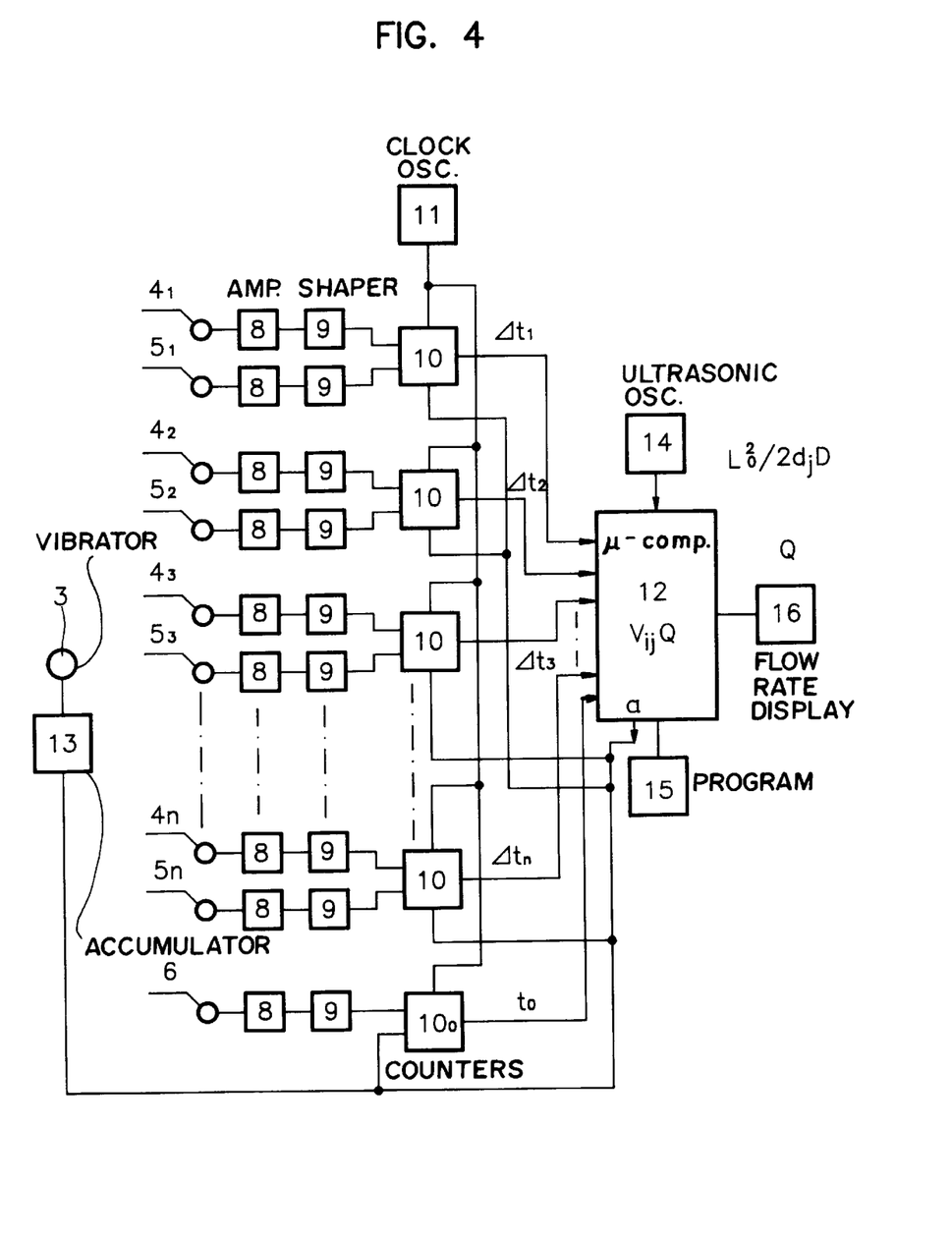
FIG. 4 is a circuit for measuring the flow velocity and the flow rate using a time difference method according to the invention.
Figure 5:
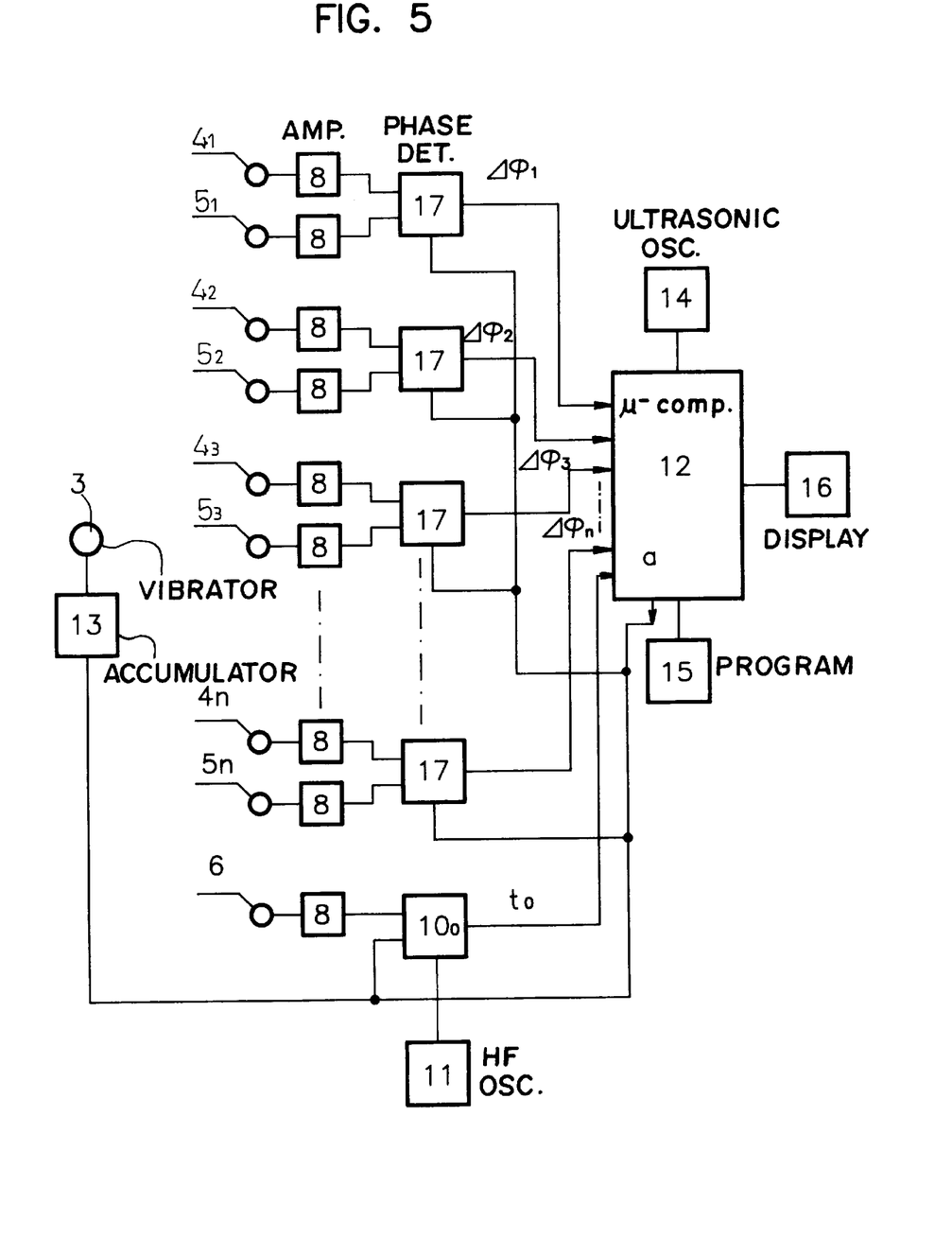
FIG. 5 is a circuit for measuring the flow velocity and the flow rate using a phase difference method according to the invention.

FIG. 4 shows a block diagram of a circuit performing the time difference flow velocity measuring method according to a multi-channel configuration of the invention. FIG. 5 represents a block diagram of a circuit performing the phase difference flow velocity measuring method according to a multi-channel configuration of the invention. The same reference numbers refer to similar parts in FIGS. 4 and 5.

An amplifier 8 amplifies the received signals from the receivers $4_i$ and $5_i$ to a given magnitude. A wave shaping device 9 converts analog signals into digital signals of a rectangular wave pulse at the time that the signals pass the cross points, so called a zero point. A time interval measuring counter 10 measures the time difference propagated from the vibrator 3 to the receivers $4_i$ and $5_i$ of the ultrasonic wave. An oscillator 11 generates the high frequency clock signal for the time interval measuring. A microprocessor 12 controls a flow rate measuring system according to its programming 15 and calculates the flow velocity and the flow rate Q at 16. An ultrasonic oscillator 14 operates the vibrator 3. An inputting apparatus 15 is used to input the control parameters such as a constant $L_o^2/2d_jD$, an inner diameter D of a tube, a period to be repeatedly measured, the frequency etc. into the microprocessor 12. An accumulator 13 accumulates the instant flow rate. A flow rate Q display 16 represents the operating state of the system.

Therefore, when the time difference flow rate measuring apparatus is operated, the microprocessor 12 generates/outputs the control signal from a port $\alpha$ and resets the counters 10, $10_0$ to be initialized, while the ultrasonic vibrator 3 operates. When the vibrator 3 emits the ultrasonic waves, the receivers $4_i$ and $5_i$ receive the ultrasonic signals propagated from the vibrator 3 in sequence. Then, the amplifiers 8 amplify the signals from the receivers $4_i$ and $5_i$ and applies them to the pulse shaping devices 9. The pulse shaping devices 9 generate pulses every time the amplified signals pass the cross points. Thus, the time difference $\Delta t_1$, etc. occurs between the pulses from the pulse shaping devices 9. The pulses are input into the counter 10, in which the first pulse from the receivers $5_i$ represents the starting of the counting, on the contrary the second pulse from the receivers $4_i$ represents the stopping signal. The counter 10 counts the number of pulses oscillated by the high frequency oscillator 11 for a time interval period between the starting signal and the stopping signal, and vise versa. Thus, the time difference $\Delta t_1$ is equal to $N_i \cdot \tau_o \cdot (\tau_o$ is a period of the pulse from the high frequency oscillator 11). Of course, it is not necessary to measure the time difference $\Delta t_1$ in the counter 10. Instead of it, the microprocessor 12 is subject to calculate the time difference by multiplying the delay times $\tau_o$.

Herein, it is known that the microprocessor 12 measures the time differences (or $N_i$) on all channels, when the vibrator 3 emits the ultrasonic waves, and stores them at its memory. Simultaneously, the times $t_o$ propagated from the vibrator 3 to the receivers $4_i$ and $5_i$ are measured and inputted to the microprocessor 12. The microprocessor 12 memorizes the constant $L_o^2/2d$, the inner diameter D of a tube, the lengths and coordinates of chords, etc. previously input from the program device 15, as required for measuring the flow velocity $V_i$, and for calculating the flow velocities $V_{ij}$ and flow rates Q of the various chords.

If the phase difference method is adapted to measure the flow rate, as shown in FIG. 5, digital phase detectors 17 are connected to the amplifiers 8, respectively. The pulse shaping device 9 is not required. The vibrator 3 emits the ultrasonic wave at given time intervals, continuously. The first ultrasonic propagation time $t_o$ from the vibrator 3 to the receiver 6 is measured using the counter $10_0$ and the high frequency oscillator 11, which is required for measuring the ultrasonic velocity C.

Figure 6:
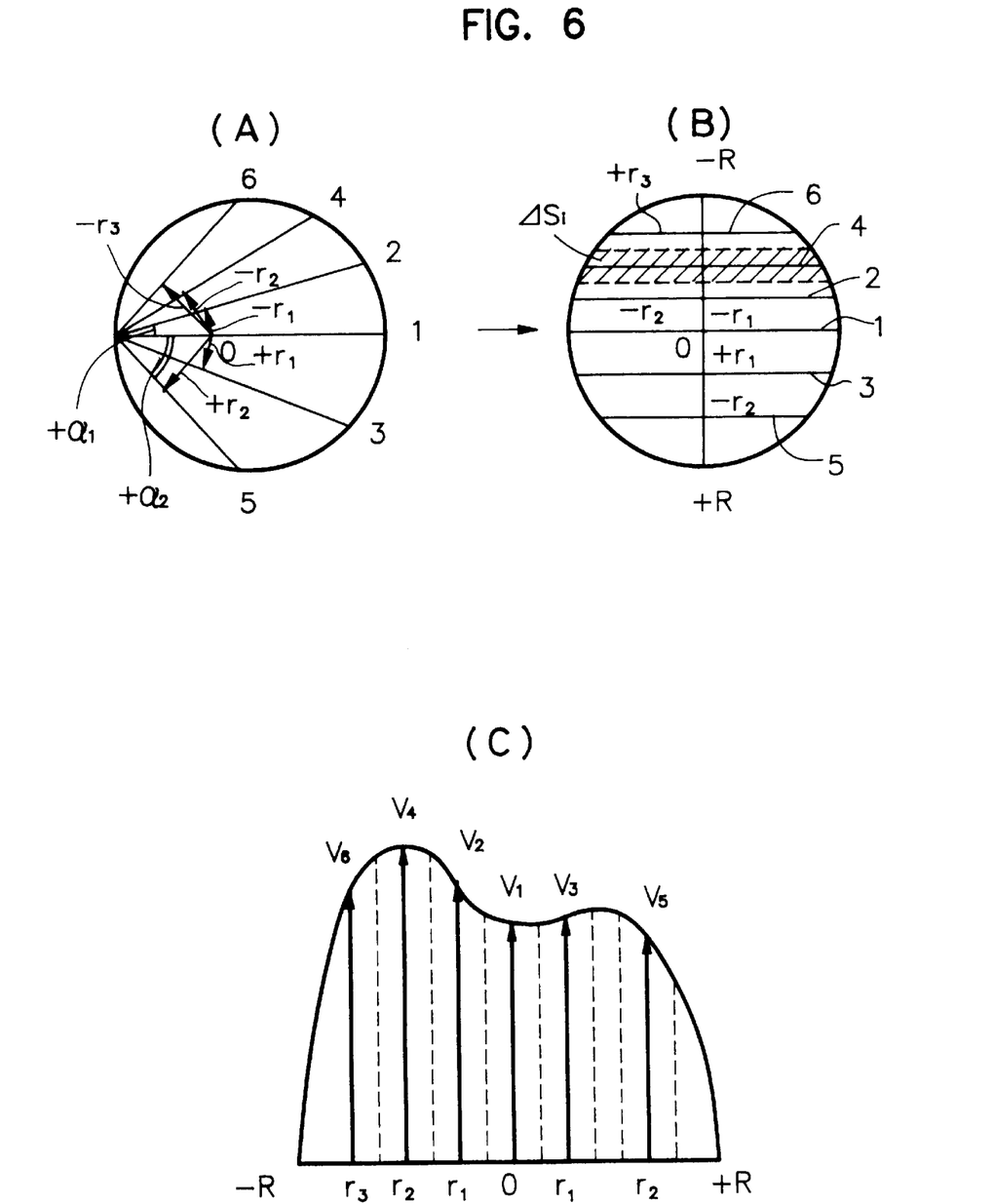

Referring to FIG. 6, in order to facilitate the calculation of the flow rate, chords 1–6 dividing the tube cross section into various radiating angles $\alpha_i$ are substituted with the coordinates of the radii $r_i$, and the flow velocities on various chords 1–6 are written as the flow velocity distribution according to the radius function $+r_i$, $-r_i$, etc. of the tube above, below and right or left of the tube center O on the diameter $-R$ to $+R$ normal to the chord 1. Thus, the total flow rate $Q = \Sigma V_1 \cdot \Delta S_i$, is calculated in a manner that the flow velocity $V_i$ for each chord ($V_i$, $V_2$, etc. in FIG. 6C) is multiplied by the regions $\Delta S_i$, and the multiplied values are summed up.

As described above, the greater the number of the flow rate measuring channels, the more the complicated flow velocity distribution becomes. However, the flow rate is more exactly calculated. The electronic circuit is simpler than that of the conventional ultrasonic multi-channel flow rate meters.

On the other hand, the prior art requires a switch for paired transducers to emit and/or receive ultrasonic pulses on one channel in a flow velocity direction and its opposite direction and a switch for selecting the different flow velocity measuring channels. Also, the time of the ultrasonic wave propagated opposite to the direction of the flow velocity must be additionally measured. It means that the counter and the microprocessor must have a larger capacity. The conventional flow rate meter cannot use the phase difference flow velocity measuring method on multi-channel flow detectors.

According to the invention, the phase difference flow velocity measuring method is easily performed. It is convenient to measure the flow rate, continuously, and to take an average of the pulsations of the flow velocity and the flow rate. Only one vibrator is used to form the flow velocity measuring channels in a radial shape. The ultrasonic wave is not a beam type with a larger energy. The receiving transducer is relatively smaller because only the receiving function is processed. Even though the number of the flow velocity measuring channels is increased, there is not any bad effect on the operation of the system. The time necessary for measuring one instant condition of the abnormal and complex flow velocity distribution due to the short straight form of the tube. The invention has a sensitivity higher than that of the prior art and can use the phase difference flow velocity measuring method for measuring the flow velocity, continuously. The invention can heighten the accuracy of the flow rate measuring in places where the flow velocity is lower or the diameter of the tube is small.

It is very effective in measuring the flow rate of gas, because the ultrasonic velocity of gas is several times lower than that of fluid, the sensitivities of the phase difference and the time difference are highly increased and an ultrasonic wave having a lower frequency or the audible wave having a higher frequency can be used.

It is easy to mount the smaller vibrator and receivers on the tube wall, because they are directed toward the center of the tube. The vibrator and receivers are not projected into the inner wall of the tube and do not form a flaw and groove, thereby not affecting the flow velocity distribution.

The flow rate measuring circuit can be realized as a simple configuration and facilitates the control of the receiving signal level. The delay times on the different flow velocity measuring channels are not required to be equal with one another.

Also, the invention is very advantageous in designing and manufacturing a gas flow rate meter or a flow rate meter for a larger caliber tube. The invention can check the flow velocity measuring error limitation by testing the time difference $\Delta t_i$ or the phase difference $\Delta \phi_i$, the interval d and the measuring error and the approximate integral error in the procedure of the flow rate calculation, thereby enabling the flow rate measuring error to be easily confirmed.

Specially, the invention can ensure the number of channels over 5 channels or 10 channels or 15 channels and reduce the approximate integral error, thereby measuring the flow rate with high accuracy at a short straight portion of the tube having the complex flow velocity distribution.

What is claimed is:

1. An ultrasonic flow meter for determining flow rates of a fluid medium flowing in a tube, said meter comprising:
   a short straight length of said tube defining a mid-point cross section along the length of said tube,
   an emitting transducer and a receiving transducer respectively mounted opposite to each other on a wall of said tube at said mid-point cross section, said emitting transducer emitting ultrasonic waves into said fluid medium, said receiving transducer for measuring a velocity of said emitted ultrasonic waves in said fluid medium,
   a plurality of receiving ultrasonic transducer pairs mounted on a circumference of the tube at said mid-point cross section along said length extending a distance (d) from left and right of the emitting transducer, said emitted ultrasonic waves being directed over a cross section of the tube into a plurality of chords of different distances between said plurality of receiving ultrasonic transducer pairs and the emitting transducer, and
   processing means (12) connected to said emitting transducer, said receiving transducer, and said plurality of receiving ultrasonic transducer pairs, said processing means (12) being responsive to a transit time of said ultrasonic waves emitted from the emitting transducer and received at said plurality of receiving ultrasonic transducer pairs for determining the flow rates of said fluid medium through said tube.

2. The ultrasonic flow meter of claim 1 wherein said emitting transducer includes an absorber (7), and said absorber is limiting propagation direction of said ultrasonic waves emitted from the emitting transducer.

3. The ultrasonic flow meter of claim 1 wherein the processing means further comprises means for determining the flow rates by a time difference measuring method.

4. The ultrasonic flow meter of claim 1 wherein the processing means further comprises means for determining the flow rates by a phase difference measuring method.

5. The ultrasonic flow meter of claim 1 wherein the processing means further comprises means for calculating a flow velocity distribution as a summation of the flow rates in said plurality of chords.

* * * * *